United States Patent [19]

Takahashi et al.

[11] Patent Number: 5,753,377
[45] Date of Patent: May 19, 1998

[54] BIAXIALLY ORIENTED POLYESTER FILM FOR LAMINATING METALLIC SHEETS

[75] Inventors: Kohzo Takahashi; Masahiro Kimura, both of Shiga-ken; Koichi Abe, Kyoto-fu; Yuzo Shimizu, Shiga-ken; Masaru Suzuki, Osaka-fu, all of Japan

[73] Assignee: Toray Industries, Inc., Tokyo, Japan

[21] Appl. No.: 812,502

[22] Filed: Mar. 7, 1997

[30] Foreign Application Priority Data

Sep. 9, 1996 [JP] Japan .................... 8-238131

[51] Int. Cl.$^6$ .................... B32B 27/06
[52] U.S. Cl. .................... 428/480; 528/272; 528/295.3; 528/298; 528/302; 528/307; 528/308; 528/308.6; 525/437; 525/444; 428/458; 428/480
[58] Field of Search .................... 528/272, 298, 528/302, 307, 308, 308.6, 295.3; 525/437, 444; 428/458, 480

[56] References Cited

U.S. PATENT DOCUMENTS

| | | | |
|---|---|---|---|
| 4,587,071 | 5/1986 | Minami et al. | 264/210.7 |
| 5,077,118 | 12/1991 | Hasegawa et al. | 428/149 |
| 5,154,789 | 10/1992 | Ossian | 156/229 |
| 5,209,972 | 5/1993 | Super et al. | 428/349 |
| 5,281,360 | 1/1994 | Hong et al. | 252/188.28 |
| 5,284,699 | 2/1994 | Nishino et al. | 428/217 |
| 5,518,811 | 5/1996 | Pedginski et al. | 428/343 |
| 5,529,740 | 6/1996 | Jester et al. | 264/317 |
| 5,609,949 | 3/1997 | Nishino et al. | 428/217 |

Primary Examiner—Samuel A. Acquah
Attorney, Agent, or Firm—Birch, Stewart, Kolasch & Birch, L.L.P.

[57] ABSTRACT

A biaxially oriented polyester film is suitable for laminating onto a metallic sheet so as to provide a laminate capable of being formed into a can. The polyester film comprises at least one of:

(1) a polyester having a melting point of 246° to 280° C. and being such that when the laminate is formed into a can, then at a neck of the can the film provides an inner 1 to 3 μm portion (a) close to the metallic sheet and an outer 1–3 μm portion (b) remote from the metallic sheet, which said portions (a) and (b) have respective average orientation intensity ratios, as measured by Raman spectrometry, of 6 or less and 8 or more; and (2) a polyester layer (A) of a polyester having at least 93 mol % thereof of units derived from ethylene terephthalate and/or ethylene naphthalate and a polyester layer (B) of a polyester containing an ionomer and which film has a face orientation factor of 0.10 to 0.15.

11 Claims, No Drawings

BIAXIALLY ORIENTED POLYESTER FILM FOR LAMINATING METALLIC SHEETS

The present invention relates to a biaxially oriented polyester film for laminating onto a metallic sheet. In more detail, it relates to a biaxially oriented polyester film for laminating onto a metallic sheet, which provides excellent taste retention of foodstuffs in contact with the film and is especially suitable for internal coating of metallic cans.

It has been widely practiced to coat metallic cans on their inner and outer surfaces of a solution or dispersion with various thermosetting resins such as epoxy based resins and phenol based resins dissolved or dispersed in a solvent, for the purpose of preventing corrosion. However, these thermosetting resin coating processes present problems in that it takes a long time for drying and that the large amount of organic solvent used causes environmental pollution.

Methods for solving these problems include laminating a film on the metallic sheet, such as a steel sheet, aluminum sheet, or any metallic sheet which has been surface-treated by plating. When the film-laminated metallic sheet is ironed or drawn to produce metallic cans, the film is required to have the following properties:

(1) To be excellent in processability during lamination onto metallic sheets, before forming.

(2) To be excellent in adhesion to metallic sheets.

(3) To be excellent in processability, without causing pinholes or other defects, after forming.

(4) Not to cause polyester film delamination, cracking or pinholes when any impact acts on the metallic cans.

(5) Not to adsorb the fragrant components of the beverage, etc. contained in the cans, and not to cause any material to be dissolved out of the film for impairing the flavor of the beverage, etc. contained in the cans (hereinafter this property is referred to as "taste property").

To meet these requirements, many proposals have been made. For example, JP-B-60-052179 discloses a resin composition consisting of a polyethylene terephthalate based resin, polybutylene terephthalate resin and ionomer, and JP-A-02-057339 discloses a copolymerized polyester film having a specific crystallinity. However, the resin composition disclosed in JP-B-60-52179 is inferior in heat resistance, causes adsorption of flavor of beverages, the ingredient of the resin composition is apt to dissolve into the beverages, and furthermore, is inferior in long term storage property. On the other hand, the film disclosed in JP-A-02-057339 is inferior in taste property after retorting and, accordingly, its storage taste property for a long term or at a high temperature is inferior, and it has been especially difficult to satisfy excellent taste property and excellent processability simultaneously.

The present invention addresses the above mentioned problems and seeks to solve them by providing a biaxially oriented polyester film, which is excellent in taste property and has excellent processability suitable for metallic cans.

SUMMARY OF THE INVENTION

According to one aspect, the present invention provides a biaxially oriented polyester film for laminating onto a metallic sheet, which film comprises a polyester having a melting point of 246° to 280° C., wherein said film has an inside average orientation ratio, $Rin_{AVE}$, and an outside average orientation ratio, $Rout_{AVE}$, as measured by Raman spectrometry, of 6 or less and 8 or more, respectively. That means, the film, in the laminate is to have a 1 to 3 μm thick portion (a) which is to lie close to the metallic sheet and a 1 to 3 μm thick portion (b) which is to lie remote from the metallic sheet, which said portions (a) and (b) are to be disposed at a neck of a can formed from the laminate, and which said portions (a) and (b) have respective average orientation ratios $Rin_{AVE}$ and $Rout_{AVE}$, as measured by Raman spectrometry, of 6 or less and 8 or more.

According to another aspect, the present invention also provides a biaxially oriented polyester film for laminating onto a metallic sheet, which film comprises a polyester layer (A) of a polyester having at least 93 mole % thereof of units derived from at least one of ethylene terephthalate and ethylene naphthalate and a polyester layer (B) of a polyester containing an ionomer and which film has a face orientation factor of 0.10 to 0.15. This film shows also an excellent impact resistance.

DETAILED DESCRIPTION OF THE PREFERRED EMBODIMENTS OF THE INVENTION

The polyester film according to one aspect of the present invention has a melting point of 246° to 280° C., preferably 250° C. to 270° C. for improved heat resistance and long-term storage taste property. To secure good taste property after heat treatment such as retorting, the amount of ethylene terephthalate and/or ethylene naphthalate is preferably 93 mol % or more, more preferably 95 mol % or more. In particular, metallic cans coated with such films and filled with beverage can be stored for a long time while maintaining good taste property. On the other hand, as far as the taste property is not impaired, another dicarboxylic acid and/or another glycol can also be copolymerized. The dicarboxylic acids which can be copolymerized include, for example, aromatic dicarboxylic acids such as isophthalic acid, naphthalene-dicarboxylic acid, diphenyldicarboxylic acid, diphenylsulfone-dicarboxylic acid, diphenoxyethanedicarboxylic acid, 5-sodiumsulfoisophthalic acid and phthalic acid, aliphatic dicarboxylic acids such as oxalic acid, succinic acid, adipic acid, sebacic acid, dimer acid, maleic acid and fumaric acid, alicyclic dicarboxylic acids such as cyclohexynedicarboxylic acid and hydroxycarboxylic acids such as p-hydroxybenzoic acid. On the other hand, the glycols which can be copolymerized include, for example, aliphatic glycols such as 1-4-butanediol, propanediol, pentanediol, hexanediol and neopentyl glycol, alicyclic glycols such as cyclohexanedimethanol, aromatic glycols such as bisphenol A and bisphenol S and diethylene glycol. As a matter of course, two or more of these dicarboxylic acids and glycols can also be used together.

If a copolymerized polyester is used as the polyester in a film of the present invention, the component preferably copolymerized with ethylene terephthalate is 2,6-naphthalenedicarboxylic acid for improved processability and taste property, or dimer acid, 1,4-cyclohexanedimethanol or 1,4-butanediol for improved impact resistance, or isophthalic acid for improved processability and adhesion to a metallic sheet in the manufacturing process for producing a can, but the component is not limited to those listed above.

Furthermore, a blend of two or more polyesters can also be used as the polyester in a film of the present invention. For example, a blend of polyethylene terephthalate and polyethylene naphthalate, a blend of polyethylene terephthalate and dimer acid-copolymerized polyethylene terephthalate, or a polyester obtained by copolymerizing polyethylene terephthalate, cyclohexanedimethanol, terephthalic acid and isophthalic acid, can be used. When a blend is melt-extruded, ester interchange may occur to promote copolymerization. However, the extent of the ester interchange is not limited.

Furthermore, in the polyester film of the present invention, polyester (C) can be further laminated. Polyester (C) is preferably a polyester having ethyleneterephthalate and/or ethylenenaphthalate as the main component. For controlling the average orientation ratios and improving to metallic sheet, a polyester (C) having a melting point lower than the substrate polyester by 2°–30° C., preferably 3°–10° C. may be used. By laminating polyester (C) with the substrate polyester, more excellent processability and taste property can be achieved. Because polyester (C) has good adhesion to a metallic sheet together with a good processability, it is preferable to laminate so that the polyester layer (C) adheres to the metallic sheet. The thickness ratio (the substrate polyester: polyester (C)) is preferably 1:20 to 20:1, more preferably, 1:10 to 10:1. However, if the melting point of polyester (C) is lower than 246° C., the ratio is preferably 2:1 to 20:1 for improved taste property.

In this invention, when a polyester layer (A) made of a polyester composition with 93 mol % or more of ethylene terephthalate and/or ethylene naphthalate as component units and a polyester layer (B) made of a polyester composition containing an ionomer are laminated and characterized by being 0.10 to 0.15 in the face orientation factor, an excellent taste property as well as excellent impact resistance can be achieved.

In the polyester (A) of the present invention, to secure good taste property after heat treatment such as retorting, the amount of ethylene terephthalate and/or ethylene naphthalate is preferably 93 mol % or more, more preferably 96 mol % or more because metallic cans coated internally with films of such polyesters and filled with beverage can maintains good taste property for a long time. On the other hand, as far as the taste property is not impaired, another dicarboxylic acid and/or another glycol can also be copolymerized. The dicarboxylic acids which can be copolymerized include, for example, aromatic dicarboxylic acids such as isophthalic acid, naphthalenedicarboxylic acid, diphenyldicarboxylic acid, diphenylsulfone-dicarboxylic acid, diphenoxyethanedicarboxylic acid, 5-sodium-sulfoisophthalic acid and phthalic acid, aliphatic dicarboxylic acids such as oxalic acid, succinic acid, adipic acid, sebacic acid, dimer acid, maleic acid and fumaric acid, alicyclic dicarboxylic acids such as cyclohexynedicarboxylic acid and hydroxycarboxylic acids such as p-hydroxybenzoic acid. On the other hand, the glycols which can be copolymerized include, for example, aliphatic glycols such as propanediol, butanediol, pentanediol, hexanediol and neopentyl glycol, alicyclic glycols such as cyclohexanedimethanol, aromatic glycols such as bisphenol A and bisphenol S and diethylene glycol. Of course, two or more of these dicarboxylic acids and glycols can also be used together.

Furthermore, as far as the effects of the present invention are not impaired, the copolymerized polyester can also be copolymerized with a polyfunctional compound such as trimellitic acid, trimesic acid or trimethylolpropane.

In the present invention, a blend of two or more of the above polymers can also be used.

The melting point of the polyester constituting the polyester layer (A) in a film of the present invention is preferably 246° C. to 280° C., more preferably 250° C. to 275° C., for improved taste property and heat resistance. If the melting point is higher than 280° C., the processability may deteriorate.

The polyester constituting the polyester layer (B) in a film of the present invention is a polymer of a dicarboxylic acid and a glycol. The dicarboxylic acids which can be used include, but are not limited to, aromatic dicarboxylic acids such as terephthalic acid, isophthalic acid, phthalic acid, naphthalenedicarboxylic acid, diphenylsulfonedicarboxylic acid, diphenyletherdicarboxylic acid, diphenoxyethanedicarboxylic acid, cyclohexanedicarboxylic acid, diphenyldicarboxylic acid, diphenoxyethanedicarboxylic acid and 5-sodiumsulfoisophthalic acid, aliphatic dicarboxylic acids such as oxalic acid, succinic acid, adipic acid, sebacic acid, dimer acid, maleic acid and fumaric acid, alicyclic dicarboxylic acids such as cyclohexanedicarboxylic acid and hydroxycarboxylic acids such as p-hydroxybenzoic acid. On the other hand, the glycols which can be used include, but are not limited to, aliphatic glycols such as ethylene glycol, butanediol, propanediol, pentanediol, hexanediol and neopentyl glycol, polyols such as polyethylene glycol, alicyclic glycols such as cyclohexanedimethanol and aromatic glycols such as bisphenol A and bisphenol S. Of course, two or more of these dicarboxylic acids and glycols can also be used together.

In the present invention, the method for incorporating into the polyester constituting the polyester layer (B) an ionomer is not especially limited. For example, the ionomer can be added to and mixed with the polyester. Specifically the polyester and the ionomer can be, as required, premixed by a blender, mixer, etc., and rendered molten and kneaded using an ordinary or vent type single-screw or double-screw extruder or kneaded in molten state with a crosslinking agent, or when the polyester film is produced, the polyester and the ionomer can be mixed and melt-extruded. As another method, an ionomer can be added when the polyester is polymerized.

The ionomer content in the polyester (B) is not especially limited, but is preferably 0.1 to 50 wt %, more preferably 1 to 30 wt %, still more preferably 5 to 30 wt % for improved impact resistance as well as adhesion and heat resistance. If the ionomer content is not in this range, especially if it is larger than 50 wt %, heat resistance may become poor.

The ionomer may be a copolymer of an α-olefin and an ionic salt of an unsaturated carboxylic acid containing monovalent or divalent metal ions. The ionomer can be, for example, a copolymer of ethylene and an unsaturated dicarboxylic acid such as acrylic acid or methacrylic acid, or a copolymer of ethylene and an unsaturated dicarboxylic acid such as maleic acid or itaconic acid, in which some or all of the carboxylic groups are neutralized by a monovalent or divalent metal such as sodium, potassium, lithium, zinc, magnesium or calcium.

In a film of the present invention, a known crosslinking agent can also be added to the polyesters constituting the polyester layers (A) and (B). The method of adding it is not especially limited. For example, the crosslinking agent can be added and mixed with the polyester during polymerization, or a polyester containing the crosslinking agent can be blended.

In a film of the present invention, to make both the processability and taste property particularly excellent, and furthermore, to make impact resistance particularly excellent, a laminate structure may be adopted since the polyester (B) containing an ionomer is excellent in adhesion to the metal and has excellent processability and since the polyester layer (A) has excellent taste property. In this case, it is preferable that the polyester layer (B) is adhered to the metal. Furthermore, the ratio of the thickness of the polyester layer (A) to that of the polyester layer (B) is preferably 1:20–20:1, more preferably 1:10–10:1.

In a film of the present invention, the difference in melting point between the polyester constituting the polyester layer (A) and the polyester constituting the polyester layer (B) is preferably 30° C. or smaller, more preferably 20° C. or smaller. If it exceeds 30° C., the processability deteriorates.

When the polyesters of the present invention are produced, any known reaction catalyst and agent for preventing discoloration can be used. The reaction catalysts which can be used include, but are not limited to, alkali metal compounds, alkaline earth metal compounds, zinc compounds, lead compounds, manganese compounds, cobalt compounds, aluminum compounds, antimony compounds and titanium compounds. The agents for preventing discoloration which can be used include, but are not limited to, phosphorus compounds. Preferably usually at any optional stage before the production of the polyester is completed, an antimony compound, germanium compound or titanium compound is added as a polymerization catalyst. As for the method, for example, in the case of a germanium compound, the germanium compound is added as a powder, or as described in JP-A-54-022234, the germanium compound can be dissolved into the glycol used as a monomer of the polyester. The germanium compounds which can be used include, for example, germanium dioxide, germanium hydroxide containing crystal water, germanium alkoxide compounds such as germanium tetramethoxide, germanium tetraethoxide, germanium tetrabutoxide and germanium ethylene glycoxide, germanium phenoxide compounds such as germanium phenolate and germanium β-naphthalate, phosphorus containing germanium compounds such as germanium phosphate and germanium phosphite and germanium acetate. Above all, germanium dioxide is preferable. The antimony compounds which can be used include, but are not limited to, antimony oxides such as antimony trioxide and antimony acetate. The titanium compounds which can be used include, but are not limited to, alkyl titanate compounds such as tetraethyl titanate and tetrabutyl titanate.

For example, a method in which germanium dioxide is added as the germanium compound in the production of polyethylene terephthalate is described below. Terephthalic acid and ethylene glycol are interesterified or esterified, and germanium dioxide and a phosphorus compound are added. The mixture is in succession polycondensed at a high temperature under reduced pressure, until a certain amount of diethylene glycol present is removed, to obtain a germanium element containing polymer. Furthermore, preferably the obtained polymer is subjected to solid phase polymerization reaction at a temperature lower than the melting point of the polymer under reduced pressure or in an inactive gas atmosphere, to decrease the acetaldehyde content, for achieving a predetermined intrinsic viscosity and content of carboxyl end groups.

In the polyesters of the present invention, the diethylene glycol content is preferably 0.01 to 3.5 wt %, and especially in the case of the polyester constituting the polyester layer (A), it is more preferably 0.01 to 2.5 wt %; still more preferably 0.01 to 2.0 wt %, since excellent taste property can be maintained even after many heat treatments such as the heat treatment in the step of can production and retorting after can production. In this case, it is considered that the oxidative decomposition resistance at higher than 200° C. is improved by the diethylene glycol component. Moreover, any known antioxidant can also be added to the polyesters constituting the polyester layers (A) and (B) by 0.0001 to 1 wt %. Furthermore, as far as the properties are not impaired, diethylene glycol may be added during polymer production.

To secure better taste property, the acetaldehyde content of the film is kept at preferably 25 ppm or less, more preferably 20 ppm or less. If the acetaldehyde content exceeds 25 ppm, the taste property is poor. The method for keeping the acetaldehyde content of the film at 25 ppm or less is not especially limited. For example, to remove the acetaldehyde produced by thermal decomposition when the polyester is produced by polycondensation reaction, etc., the polyester can be heat-treated under reduced pressure or in an inactive gas atmosphere at a temperature lower than the melting point of the polyester. As another preferable method, the polyester is subjected to solid phase polymerization under reduced pressure or in an inactive gas atmosphere at a temperature higher than 155° C. and lower than the melting point. As another method, the polymer is melt-extruded using a vent type extruder. As still another method, the polymer is melt-extruded at an extrusion temperature higher than the melting point of the polymer component highest in melting point and not higher than 30° C.+ that melting point, preferably higher than that melting point and not higher than 25° C.+ that melting point within a short time, preferably within an average melting time of less than 1 hour.

In accordance with one aspect of the present invention, the film has an inside average orientation ratio, $Rin_{AVE}$, and an outside average orientation ratio, $Rout_{AVE}$, as measured by Raman spectrometry, of 6 or less and 8 or more, respectively.

$Rin_{AVE}$ is preferably 4 or less, more preferably, 3 or less and $Rout_{AVE}$ is preferably 10 or more, more preferably 11 or more. If $Rin_{AVE}$ exceeds 6, the adhesion between the film and the metallic sheet becomes insufficient so that the problem of cracking may arise. Furthermore, the above properties deteriorate with the lapse of time especially after retorting. On the other hand, if $Rout_{AVE}$ is lower than 8, the flavor component, etc. of the beverage, etc. is adsorbed more, to impair the taste property. Furthermore, in addition to adsorption, the components of the beverage, etc. permeate the film in large quantities, deteriorating the film. In this invention, as explained later, each of $Rin_{AVE}$ and $Rout_{AVE}$ means an average orientation intensity ratio of a 1 to 3 μm thick portion (a) which is to lie close to the metallic sheet and a 1 to 3 μm thick portion (b) which is to lie remote from the metallic sheet, and which said portions (a) and (b) are to be disposed at a neck of a can formed from the laminate. Thus, $Rin_{AVE}$ and $Rout_{AVE}$ are those values measured, by Raman spectrometry, after formation of the can by laminating at 50 m/min to a TFS steel sheet heated to 170°–280° C. so as to have the polyester layer (B) or polyester layer (C) (or in the case of a mono-layer film the casting surface) adhering to the steel sheet, and quickly cooling and drawing the laminate by a drawing machine [drawing ratio (maximum thickness/minimum thickness)=1.3, drawn in a temperature range within which the laminate is drawable].

To achieve the above values of $Rin_{AVE}$ and $Rout_{AVE}$, for example, the face orientation factor is preferably 0.10 to 0.15, more preferably is 0.10 to 0.14, and preferably the film is a laminated film having polyester layer containing ionomer, and furthermore, the film preferably has a crystalline size x of (100) face of 6 mm or less, more preferably 5.5 mm or less, as measured by X-ray diffractometry.

Alternatively, the above values of $Rin_{AVE}$ and $Rout_{AVE}$ can be achieved by, for example, making the difference between the face orientation factor of the layer on the metallic sheet side and that on the non-metallic-sheet side preferably 0.001 to 0.05 and more preferably 0.005 to 0.02 or making the face orientation factor of the laminated film of the polymers having different melting temperatures preferably 0.10 to 0.14, more preferably 0.105 to 0.13. When polyesters having different melting temperatures are used, the difference of the melting temperatures is preferably 2° to 30° C. Of course, methods for achieving the values of $R_{inAVE}$ and $R_{outAVE}$ are not limited to the above.

Moreover, in a film of the present invention, the face orientation factor is preferably 0.10 to 0.15, since the ease with which the film is able to laminate onto the metallic sheet, its subsequent processability and its high impact resistance can be maintained. Especially for higher processability, the face orientation factor is preferably 0.10 to 0.145, more preferably 0.10 to 0.14. If the face orientation factor is too high, ability to laminate and processability deteriorate. Thus, the taste property after can forming also deteriorates. On the other hand, if the face orientation factor is less than 0.10, the film formability deteriorates. The face orientation factor is obtained by measuring the surface of the film on the non-metallic-sheet side. The face orientation factor depends on stretching conditions and the properties of the polyesters. For example, the stretching ratio (area ratio), although it depends on the kind of polyester, is preferably 6 to 12 times, and stretching temperature is preferably the glass transition temperature +10° C. or more and glass transition temperature +60° C. or less, more preferably, the glass transition temperature +25° C. or more and glass transition temperature +50° C. or less. The heat treating temperature is preferably, the melt temperature −100° C. to the melt temperature −15° C., and a heat treatment time of 1 to 15 seconds is particularly preferable. Too long a heat treatment time brings about high crystallinity and too high a face orientation factor. Too short a heat treatment time makes it possible to control face orientation factor within a desired range; however, dimensional stability of the film is then apt to becomes impaired. Furthermore, it is desirable to cool sufficiently after casting and stretching. Of course, methods for making polyester film of this invention are not limited to the above.

When the polyester film consists of at least two or more layers, the difference between the face orientation factor of the layer on the metallic sheet side and that on the non-metallic-sheet side is preferably 0.001 to 0.05 and more preferably 0.005 to 0.02. This can be achieved, for example, by providing a temperature difference between both surfaces of the film in the steps of manufacture, such as casting, stretching in machine direction, stretching in transverse direction or heat treatment.

In the present invention, to further improve the taste property, the intrinsic viscosity of the polyester is preferably 0.5 dl/g or more, more preferably 0.55 dl/g or more, still more preferably 0.6 or more. If the intrinsic viscosity is less than 0.5 dl/g, the taste property is aggravated undesirably due to dissolved out oligomer.

In the polyester film of the present invention, the mean value of the elongation at breakage in each of the machine direction of the film and the transverse direction is preferably 130% or more, more preferably 140% or more, still more preferably 150% or more, for higher processability. This can be achieved by selecting polyester and controlling film forming conditions, particularly, stretching temperature and stretching ratio, but not limited only thereto. The stretching temperature for machine direction is preferably, Tg+25° C. or more and not so high so that the film tends to stick to the roll. The stretching ratios are, for machine direction 2.0 to 3.5 times and for lateral direction, 2.0 to 3.5 times.

The thickness irregularity of the polyester film of the present invention is preferably 30% or less, more preferably 20% or less. If the thickness irregularity exceeds 30%, uniform forming is difficult, and pinholes and cracks may occur after forming.

In the polyester film of the present invention, the mean value of the heat shrinkage in each of the machine direction of the film and the transverse direction at 150° C. is preferably 0.5% to 10%, more preferably 1% to 5%. If the heat shrinkage is higher than 10%, ability to laminate deteriorates, and hence subsequent processability may deteriorate. Methods for achieving the above stated average heat shrinkage include, of course, controlling conditions for stretching and heat treatment; however, for example, it can be said that, to prevent decreasing heat shrinkage, a high heat treatment temperature or a long heat treatment time or heat setting with relaxation is effective. The heat setting with relaxation may be controlled to provide relaxation at desired ratios for both of the machine direction and the transverse direction, however, 3–10% is preferable for each direction and it can be one stage or multi-stage.

In the present invention, the crystalline size x of (100) face of the biaxially oriented film is preferably 6 nm or less, more preferably 5.5 nm or less, still more preferably 5 nm, especially preferably 4.5 nm or less, as measured by X-ray diffractometry, for improved ability to laminate and processability. If the crystalline size x of (100) face exceeds 6 nm, ability to laminate and processability may be insufficient. The crystalline size x of (100) face is obtained by reflected X ray diffraction using Scherrer's formula. A crystalline size of (100) face of 6 nm or less is determined by the polymers constituting the film, additives, stretching conditions and heat treatment conditions, and can be achieved by setting them as desired. For example, it can be achieved by lowering the heat treatment temperature and keeping the heat treatment time within 10 seconds, but these must be set in a range to satisfy the properties required for the film.

The thickness of the biaxially oriented film of the present invention is preferably 3 to 50 μm, more preferably 5 to 35 μm, still more preferably 8 to 30 μm for improved processability after lamination on the metal, coatability onto the metal, impact resistance and taste property.

In the present invention, for improved heat resistance and taste property, biaxial stretching is necessary. The biaxial stretching can be either simultaneous biaxial stretching or sequential biaxial stretching.

The method for producing the biaxially oriented film of the present invention is not especially limited. For example, the respective polyesters are dried, supplied to different conventional extruders, melted, laminated and extruded from a slit die as a sheet, brought into close contact with a casting drum by, for example, electrostatic application, to be cooled and solidified, for obtaining a cast film. The stretching method can be either simultaneous biaxial stretching or sequential biaxial stretching. The cast sheet is stretched in the machine direction and transverse direction of the film, and heat-treated to obtain a film with an intended face orientation degree. For improved quality of the film, the use of a tenter is preferable, and sequential biaxial stretching to at first stretch in the machine direction and then to stretch in the transverse direction, or simultaneous biaxial stretching is desirable. The stretching ratio is 1.6 to 4.2 times, preferably 1.7 to 4.0 times in the respective directions. Either of the stretching ratios in the machine and transverse directions can be larger, or the stretching ratios can be equal. The stretching speed is desirably 1000%/min to 200000%/min. The stretching temperature can be any optional temperature higher than the glass transition temperature of the polyester and lower than the glass transition temperature +100° C., but preferably 80° to 170° C. Furthermore, the biaxially oriented film is heat-treated in an oven or on a heated roll or any other conventional method. The heat treatment temperature can be any optional temperature of 120° C. to 250° C., but preferably 120° C. to 245° C. The heat treatment time is optional, but preferably 1 to 60 seconds. The heat treatment can be effected while the film is relaxed in the machine direction and/or the transverse direction. Furthermore, re-stretching can also be effected once or more in each direction, and it can also be followed by heat treatment.

For better handling and processability of the film of the present invention, it is preferable that internal and/or external grains, inorganic and/or organic grains of 0.01 to 10 µm in average grain size are present in an amount of 0.01 to 50 wt %. It is especially preferable that in a film used on the inner surface of a can, internal grains, inorganic grains and/or organic grains of 0.1 to 5 µm in average grain size are present in an amount of 0.01 to 3 wt %. For precipitating internal grains, conventional techniques can be used. For example, techniques proposed in JP-A-48-061556, JP-A-51-012860, JP-A-53-041355 and JP-A-54-090397 can be used. Furthermore, other grains as proposed in JP-A-55-020496 and JP-A-59-204617 can also be used together. If grains of more than 10 µm in average grain size are used, the film is likely to have defects. The grains include inorganic grains of, for example, wet process silica, dry process silica, colloidal silica, aluminum silicate, titanium oxide, calcium carbonate, calcium phosphate, barium sulfate, alumina, mica, kaolin, clay and organic grains with styrene, silicone or acrylic acid as a component. Among them, inorganic grains of wet process and dry process colloidal silica and alumina and organic grains with styrene, silicone, acrylic acid, methacrylic acid, polyester, or divinylbenzene as a component can be preferably used. Two or more kinds of these internal grains, inorganic grains and/or organic grains can also be used together.

When the film is used on the inner surface of a can, the center line average roughness Ra is preferably 0.005 to 0.10 µm, more preferably 0.01 to 0.05 µm. Furthermore, if the ratio Rt/Ra of maximum roughness Rt to center line average roughness Ra is 4 to 50, preferably 6 to 40, high speed can productivity can be enhanced. The center line average roughness Ra of the layer (A) is preferably 0.002 to 0.04 µm, more preferably 0.003 to 0.03 µm, because the taste property can be improved.

Furthermore, surface treatment of the film by, for example, corona discharge, can improve the adhesion properties. In this case, the E value is 5 to 50, preferably 10 to 45.

Moreover, the film of the present invention can be coated in various ways.

The metallic sheet of the present invention is not especially limited, but for improved processability, a metallic sheet of, for example, iron or aluminum, is preferable. When a metallic sheet of iron is used, it can also be coated on the surface with an inorganic oxide layer, for example, a chemical conversion coating layer typically formed by chromic acid treatment, phosphate treatment, chromic acid/phosphate treatment, electrolytic chromic acid treatment, chromate treatment or chromium chromate treatment. Especially a chromium hydrate oxide layer of 6.5 to 150 g/m$^2$ as chromium metal is preferable, and furthermore, a malleable metal plating layer of, for example, nickel, tin, zinc, aluminum, gun metal or brass can also be formed. In the case of tin plating, the plating amount is preferably 0.5 to 15 mg/m$^2$, and in the case of nickel or aluminum plating, 1.8 to 20 g/m$^2$.

The biaxially oriented polyester film of the present invention can be suitably used to cover the inside surface of a two-piece metallic can produced by drawing or ironing after laminating the film onto a metallic sheet. It can also be preferably used to cover the cover of a two-piece can or the body, cover and bottom of a three-piece can because it can adhere well to metals and is good in processability.

EXAMPLES

Embodiments of the present invention are described in more detail below with reference to the following Examples. The properties were measured and evaluated according to the following methods.

(1) Face orientation factor

The surface of a polyester layer (A) was measured using an Abbe's refractometer with sodium D line (589 nm in wavelength) as the light source. From the refractive indexes in the longitudinal direction, lateral direction and thickness direction (Nx, Ny, Nz), the face orientation factor fn=(Nx+Ny)/2−Nz was calculated. Measurements were taken on the surface destined to form the surface remote from the metallic sheet.

(2) Melting point

A polyester was dried, rendered molten and quickly cooled, and the melting point was measured at a heating rate of 10° C./min by a differential scanning calorimeter (DSC-2 produced by Perkin Elmer).

(3) Elongation (%) at breakage of film

The elongation (%) at breakage was measured using a Tensilon tensile testing machine, at a tensile speed of 300 mm/min using a sample of 10 mm in width and 100 mm in length.

(4) Heat shrinkage

Lines were marked on a film sample at a 200 mm interval, and the film was cut to have a width of 10 mm and suspended in the longitudinal direction. It was loaded with 1 g in the longitudinal direction and heated using 190° C. air for 20 minutes. The length between the marked lines was measured, and the shrinkage of the film was expressed as a percentage to the original length.

(5) Crystalline size x

The crystalline size x of (100) face was obtained by reflected X ray diffraction using Scherrer's formula. The measuring X ray wavelength was 0.15418 nm, and the diffraction of (100) face was observed at a Bragg angle of about 12.7°.

(6) Thickness irregularity

The thicknesses of a film sample were measured at 100 mm intervals for 2 m in the longitudinal direction, to obtain the mean value Xo, and the maximum value of the values obtained by subtracting the mean value Xo from the respective measured thicknesses was expressed by Xm. The thickness irregularity was expressed by the value of Xm/X0 as a percentage. In this case, this measurement was repeated 10 times, and the mean value was adopted as the thickness irregularity.

(7) Intrinsic viscosity of polyester

A polyester was dissolved into ortho-chlorophenol, and the intrinsic viscosity was measured at 25° C.

(8) Inside average orientation ratio, $Rin_{AVE}$, and outside average orientation ratio, $Rout_{AVE}$ Measurement was effected using Ramaonor T-64000 (Jobin Yvon), Ar$^+$ laser as the light source and CCD (Jobin Yvon 1024×256) as the detector.

At 50 m/min, a film and a 0.24 mm thick TFS steel sheet heated to 170°–280° C. were laminated to have the polyester layer (B) or polyester layer (C) (in case of mono-layer film, the casting surface) adhering to the steel sheet, and the laminate was quickly cooled and drawn by a drawing machine (drawing ratio (maximum thickness/minimum thickness)=1.3, drawn in a drawable temperature range). The neck portion was cut out and embedded in an epoxy resin, and a section was cut off in the longitudinal direction by a microtome. The section was in the longitudinal direction/ thickness direction of the film.

After measurement, the average orientation intensity ratio of the inner 1 to 3 μm portion adjacent to the metallic sheet at the neck of a laminated can measured by Raman spectrometry was expressed as $Rin_{AVE}$, and the average orientation intensity ratio in the outer 1 to 3 μm portion remote from the metallic sheet measured by Raman spectrometry, as $Rout_{AVE}$. The neck portion was found in the usual way and the ratio of the can diameter before and after "neck-in" was 1/0.85 (before/after).

(9) Processability a. Before heat treatment

At 50 m/min, a film and a 0.24 mm thick TFS steel sheet heated to 170°–280° C. were laminated to have the polyester layer (B) or polyester layer (C) (in the case of a mono-layer film, the casting surface) adhering to the steel sheet, and the laminate was quickly cooled and drawn by a drawing machine (drawing ratio (maximum thickness/minimum thickness)=1.3, drawn in a drawable temperature range) to obtain a can.

Thus obtained can was filled with 1% common salt water and allowed to stand for one day. Then, a voltage of 6 V was applied between an electrode in the common salt water and the metallic can, and 10 seconds later, the current value was read. The mean value for 10 cans was obtained.

Class A: Less than 0.001 mA
Class B: 0.001 mA to less than 0.01 mA
Class C: 0.01 mA to less than 0.05 mA
Class D: 0.05 mA or more b. After heat treatment The cans obtained in the above were heat treated at 230° C. for 10 seconds, and were formed into neck so that the ratio of the can diameter before and after neck-in is 1/0.82 (before/after). The cans were retorted at 120° C. for 30 min. and allowed to stand for one day in 37° C. water, filled with 1% common salt water and allowed to stand for one day. Then, a voltage of 6 V was applied between an electrode in the common salt water and the metallic can, and 10 seconds later, the current value was read. The mean value for 10 cans was obtained.

Class A: Less than 0.1 mA
Class B: 0.1 mA to less than 0.2 mA
Class C: 0.2 mA to less than 0.4 mA
Class D: 0.4 mA or more

(10) Taste property

The cans (6 cm in diameter and 12 cm in height) formed as above were pressurized and steamed at 130° C. for 60 minutes, filled with water, sealed at 40° C., allowed to stand for one month, and opened. The change of odor was evaluated by a sensory test according to the following criterion:

Class A: Odor did not change at all.
Class B: Odor little changed.
Class C: Odor changed a little.
Class D: Odor greatly changed.

(11) Impact resistance 350 g of water was filled into a can and sealed. After allowing to stand at 30° C. for 72 hours, an impact was applied by dropping the can from 50 cm height onto concrete ground so that the angle of the bottom of the can relative to the ground was 45°. Next, after removing the contents of the can, its internal surface was masked with paraffin wax, filled with 1% common salt water, allowed to stand for one day, and a voltage of 6 V was applied between an electrode in the common salt water and the metallic can, and 5 seconds later, the current value was read. The mean value for 10 cans was obtained.

Class A: Less than 0.3 mA
Class B: 0.3 mA to less than 0.5 mA
Class C: 0.5 mA to less than 1.0 mA
Class D: 1.0 mA or more

(12) As polyesters, the following polyesters were used.

Polyester A: Polyethylene terephthalate (PET) of 0.64 dl/g in intrinsic viscosity and 256° C. in melting point Polyester B: PET of 0.70 dl/g in intrinsic viscosity and 254° C. in melting point Polyester C: PET of 0.82 dl/g in intrinsic viscosity and 251° C. in melting point Polyester D: Isophthalic acid copolymerized polyethylene terephthalate (PET/I: 3 moles of isophthalic acid) of 0.68 dl/g in intrinsic viscosity and 248° C. in melting point Polyester E: PET/I (6 moles of isophthalic acid) of 0.67 dl/g in intrinsic viscosity and 240° C. in melting point Polyester F: PET/I (13 moles of isophthalic acid) of 0.67 dl/g in intrinsic viscosity and 225° C. in melting point Polyester G: Polyester G containing ethylene copolymer ionomer was obtained by melt-kneading 95 parts by weight of the polyester A and 5 parts by weight of Zn ionomer of ethylene-methacrylic acid copolymer of 18 wt % in methacrylic acid content and 65% in Zn neutralization degree by a double-shaft kneader.

Polyester H: Polyester H containing ethylene copolymer ionomer was obtained by melt-kneading 80 parts by weight of the polyester B and 20 parts by weight of Zn ionomer of ethylene-methacrylic acid copolymer of 20 wt % in methacrylic acid content and 70% in Zn neutralization degree) by a vent type double-shaft kneader.

Polyester I: Trimellitic acid copolymerized polyethylene terephthalate (0.7 mol % of trimellitic acid)

Polyester J: Blend of 90 wt % of polyethylene naphthalate (PEN: 0.73 in intrinsic viscosity and 266° C. in melting point) and 10 wt % of polyethylene terephthalate (PET: 0.68 in intrinsic viscosity and 254° C. in melting point).

Polyester K: 2,6-naphthalenedicarboxylic acid copolymerized polyethylene terephthalate (5 mol % of 2,6-naphthalenedicarboxylic acid) of 0.68 in intrinsic viscosity and 246.4° C. in melting point.

Polyester L: PET/I (4.5 moles of isophthalic acid) of 0.69 dl/g in intrinsic viscosity and 247° C. in melting point.

Polyester M: PET/DA (3 moles of dimer acid) of 0.71 dl/g in intrinsic viscosity and 249° C. in melting point.

Polyester N: PE/CT (6 moles of 1,4-cyclohexanedimethanol) of 0.78 dl/g in intrinsic viscosity and 246° C. in melting point.

Polyester O: PE/CT (33 moles of 1,4-cyclohexanedimethanol) of 0.76 dl/g in intrinsic viscosity and 194° C. in melting point.

Polyester P: PET/I (25 moles of isophthalic acid) of 0.67 in intrinsic viscosity and 197° C. in melting point.

Polyester Q: 2,6-naphthalenedicarboxylic acid copolymerized polyethylene terephthalate (7.5 mol % of 2,6-naphthalenedicarboxylic acid) of 0.66 in intrinsic viscosity and 233.9° C. in melting point

Example 1

The polyester B destined to form a polyester layer (A) and the polyester G destined to form a polyester layer (B) were respectively sufficiently dried, separately rendered molten according to a conventional method, and co-extruded from adjacent dies, and the laminate was quickly cooled to be solidified, to obtain a cast laminate film. The cast laminate film was stretched to 3.1 times at 112° C. in the machine direction, stretched to 3.0 times at 115° C. in the transverse direction, and heat-treated at 200° C. at a relaxation of 5% for 5 seconds. The film properties and can properties are shown in Tables 2 and 3. Very excellent processability and taste property could be obtained.

Examples 2 to 8

Films as shown in Table 1 were obtained as described in Example 1, except that the polyesters used, film production method, etc. were changed. As shown in Tables 2 and 3, excellent film properties and can properties could be confirmed. In Example 8, the melting point of the polyester (C) after extrusion was 247° C.

Examples 9 to 14

Films as shown in Tables 4 and 5 were obtained as described in Example 1, except that the polyesters used, film production method, etc. were changed. As shown in Tables 5 and 6, excellent film properties and can properties could be confirmed.

Comparative examples 1 to 3

Films as shown in Tables 1 and 2 were obtained as described in Example 1, except that the polyesters used, film production method, etc. were changed. As shown in Table 3, the properties of the films obtained were poor.

Comparative examples 4 to 6

Films as shown in Table 6 were obtained as described in Example 1, except that the polyesters used, film production method, etc. were changed. As shown in Table 6, the properties of the films were poor.

TABLE 1

| | Polyester layer (A) | | Polyester layer (B) or (C) | |
|---|---|---|---|---|
| | Polyester | Thickness μm | Polyester | Thickness μm |
| Example 1 | Polyester B | 20 | Polyester G | 5 |
| Example 2 | Polyester D | 20 | Polyester G | 5 |
| Example 3 | Polyester E | 20 | Polyester G | 5 |
| Example 4 | Polyester B | 20 | Polyester H | 5 |
| Example 5 | Polyester A | 20 | Polyester G | 5 |
| Example 6 | Polyester C | 20 | Polyester H | 5 |
| Example 7 | Polyester A | 20 | Polyester G + I | 5 |
| Example 8 | Polyester C | 22 | Polyester J | 3 |
| Comparative example 1 | Polyester A | 20 | Polyester A | 5 |
| Comparative example 2 | Polyester F | 20 | Polyester G | 5 |
| Comparative example 3 | Polyester B | 20 | Polyester G | 5 |

TABLE 2

| | Elongation at breakage (%) | Heat shrinkage (%) | x | Thickness irregularity (%) | Face orientation factor |
|---|---|---|---|---|---|
| Example 1 | 180 | 3.7 | 4.8 | 8 | 0.119 |
| Example 2 | 175 | 7.2 | 4.1 | 10 | 0.112 |
| Example 3 | 185 | 3.9 | 4.5 | 10 | 0.116 |
| Example 4 | 125 | 3.4 | 5.1 | 10 | 0.138 |
| Example 5 | 140 | 2.8 | 5.6 | 12 | 0.133 |
| Example 6 | 150 | 3.5 | 4.6 | 27 | 0.125 |
| Example 7 | 150 | 3.1 | 4.4 | 13 | 0.128 |
| Example 8 | 145 | 2.6 | 4.8 | 12 | 0.131 |
| Comparative example 1 | 120 | 3.0 | 6.2 | 9 | 0.140 |
| Comparative example 2 | 130 | 3.2 | 5.0 | 16 | 0.134 |
| Comparative example 3 | 105 | 1.5 | 7.1 | 10 | 0.155 |

TABLE 3

| | Processability a | Processability b | Impact Resistance | Taste property |
|---|---|---|---|---|
| Example 1 | A | A | A | A |
| Example 2 | A | A | A | B |
| Example 3 | A | A | B | C |
| Example 4 | A | B | A | A |
| Example 5 | A | B | A | A |
| Example 6 | A | B | A | A |
| Example 7 | A | B | B | B |
| Example 8 | A | B | B | A |
| Comparative example 1 | C | D | D | D |
| Comparative example 2 | B | C | D | D |
| Comparative example 3 | C | D | C | D |

TABLE 4

| | Polyester layer | | Polyester (C) | |
|---|---|---|---|---|
| | Polyester | Thickness μm | Polyester | Thickness μm |
| Example 9 | Polyester C | 20 | Polyester Q | 5 |
| Example 10 | Polyester K | 20 | — | — |
| Example 11 | Polyester L | 23 | — | — |
| Example 12 | Polyester M | 20 | — | — |
| Example 13 | Polyester N | 25 | — | — |
| Example 14 | Polyester B | 20 | Polyester F | 5 |
| Comparative example 4 | Polyester A | 20 | Polyester O | 5 |
| Comparative example 5 | Polyester F | 25 | — | — |
| Comparative example 6 | Polyester P | 25 | — | — |

TABLE 5

|  | Elongation at breakage (%) | Heat shrinkage (%) | x | Thickness irregularity (%) | Face orientation factor | Difference of Face Orientation Factor |
|---|---|---|---|---|---|---|
| Example 1 | 170 | 4.0 | 4.3 | 11 | 0.118 | 0.020 |
| Example 9 | 165 | 3.9 | 4.5 | 12 | 0.114 | 0.016 |
| Example 10 | 175 | 4.5 | 5.2 | 10 | 0.121 | 0.009 |
| Example 11 | 170 | 3.1 | 4.8 | 6 | 0.126 | 0.008 |
| Example 12 | 180 | 3.8 | 4.9 | 11 | 0.119 | 0.009 |
| Example 13 | 155 | 2.9 | 5.3 | 12 | 0.125 | 0.010 |
| Example 14 | 160 | 3.5 | 4.8 | 14 | 0.119 | 0.018 |
| Comparative example 4 | 125 | 2.6 | 6.1 | 8 | 0.138 | 0.052 |
| Comparative example 5 | 135 | 3.0 | 5.1 | 7 | 0.136 | 0.0002 |
| Comparative example 6 | 195 | 6.0 | 3.6 | 22 | 0.103 | 0.0003 |

TABLE 6

|  | RinAVE | RoutAVE | Process-ability a | Process-ability b | Taste property |
|---|---|---|---|---|---|
| Example 1 | 3.9 | 12.5 | A | A | A |
| Example 9 | 4.3 | 12.8 | A | A | A |
| Example 10 | 2.8 | 11.4 | A | A | A |
| Example 11 | 3.4 | 8.5 | A | B | C |
| Example 12 | 3.6 | 9.3 | A | A | B |
| Example 13 | 2.9 | 11.8 | A | A | A |
| Example 14 | 3.9 | 12.2 | A | B | A |
| Comparative example 4 | 8.1 | 14.5 | C | D | D |
| Comparative example 5 | 6.0 | 13.4 | B | B | D |
| Comparative example 6 | 2.1 | 5.9 | C | C | D |

We claim:

1. A biaxially oriented polyester film for laminating onto a metallic sheet, which film comprises a polyester having a melting point of 246° to 280° C., wherein said film has an inside average orientation ratio, RinAVE, and an outside average orientation ratio, RoutAVE, as measured by Raman spectrometry, of 6 or less and 8 or more, respectively.

2. A biaxially oriented polyester film for laminating onto a metallic sheet, which film comprises a polyester layer (A) of a polyester having at least 93 mole % thereof of units derived from at least one of ethylene terephthalate and ethylene naphthalate and a polyester layer (B) of a polyester containing an ionomer and which film has a face orientation factor of 0.10 to 0.15.

3. A biaxially oriented polyester film according to claim 1, which film comprises a polyester layer (A) of a polyester having at least 93 mole % thereof of units derived from at least one of ethylene terephthalate and ethylene naphthalate and a polyester layer (B) of a polyester containing an ionomer and which film has a face orientation factor of 0.10 to 0.15.

4. A biaxially oriented polyester film according to claim 2, wherein the polyester of the polyester layer (A) has a melting point of 246° C. to 280° C.

5. A biaxially oriented polyester film according to claim 1, wherein the mean value of the elongation at breakage thereof in each of the machine direction and the transverse direction of the film is 130% or more.

6. A biaxially oriented polyester film according to claim 1, wherein the mean value of the heat shrinkage thereof in each of the machine direction, and the transverse direction, of the film at 150° C. is 0.5% to 10%.

7. A biaxially oriented polyester film according to claim 1, wherein the crystalline size of (100) face obtained by X-ray diffractometry is 6 nm or less.

8. A biaxially oriented polyester film according to claim 2 or 3, wherein the polyester of the polyester layer (B) contains a crosslinking agent.

9. A biaxially oriented polyester film according to claim 1, comprising a polyester copolymerized with at least one of 2,6-naphthalenedicarboxylic acid, dimer acid, 1,4-hexamethylenedimethanol, 1,4-butanediol and isophthalic acid.

10. A biaxially oriented polyester film according to claim 1, which film consists of at least two layers, one of which said two layers is to lie close to the metallic sheet and the other of which said two layers is to lie remote from the metallic sheet, which said two layers have respective face orientation factors different from one another, which said difference therebetween is 0.001 to 0.05.

11. A biaxially oriented polyester film according to claim 1, which film consists of two polyester layers, one of which said two layers is to lie close to the metallic sheet and the other of which said two layers is to lie remote from the metallic sheet, the said one layer which is to lie close to the metallic sheet being of a polyester (C) having a melting point lower by 2° to 30° C. than the melting point of the polyester of the other of the said two polyester layers which is to lie remote from the metallic sheet.

* * * * *

UNITED STATES PATENT AND TRADEMARK OFFICE
CERTIFICATE OF CORRECTION

PATENT NO. : 5,753,377
DATED : May 19, 1998
INVENTOR(S) : TAKAHASHI et al.

It is certified that error appears in the above-indentified patent and that said Letters Patent is hereby corrected as shown below:

In column 13, line 50, Table 1, please delete "or (C)".

In column 15, line 6, Table 5, in the row labeled "Example 1," please change "170" to -- 180 --; change "4.0" to -- 3.7 -- ; change "4.3" to -- 4.8 --; and change "11" to -- 8 --.

Signed and Sealed this

Second Day of November, 1999

Attest:

Q. TODD DICKINSON

Attesting Officer

Acting Commissioner of Patents and Trademarks